(12) United States Patent
Lau

(10) Patent No.: US 11,455,659 B2
(45) Date of Patent: Sep. 27, 2022

(54) DISPLAY PANELS OF POINT OF SALE SYSTEMS

(71) Applicant: Hewlett-Packard Development Company, L.P., Spring, TX (US)

(72) Inventor: King-Yan Lau, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/042,162

(22) PCT Filed: Jul. 20, 2018

(86) PCT No.: PCT/US2018/042997
§ 371 (c)(1),
(2) Date: Sep. 27, 2020

(87) PCT Pub. No.: WO2020/018111
PCT Pub. Date: Jan. 23, 2020

(65) Prior Publication Data
US 2021/0365990 A1   Nov. 25, 2021

(51) Int. Cl.
*G06Q 30/02*   (2012.01)
*G06F 3/147*   (2006.01)
*G06F 3/16*   (2006.01)

(52) U.S. Cl.
CPC ......... *G06Q 30/0268* (2013.01); *G06F 3/147* (2013.01); *G06F 3/16* (2013.01)

(58) Field of Classification Search
None
See application file for complete search history.

(56) References Cited

U.S. PATENT DOCUMENTS

| 9,129,274 | B1 | 9/2015 | Mocko et al. |
| 9,275,526 | B2 | 3/2016 | Skiles |
| 9,633,345 | B2 | 4/2017 | Nichols et al. |
| 2010/0262504 | A1 | 10/2010 | Tamura |
| 2011/0225056 | A1 | 9/2011 | A Akiyama |
| 2012/0268398 | A1 | 10/2012 | Kato |
| 2014/0028541 | A1* | 1/2014 | Truong ............... G06F 1/1601 345/156 |

(Continued)

FOREIGN PATENT DOCUMENTS

| AU | 2017213565 A1 * | 8/2017 | ............ G06Q 20/00 |
| EP | 3210097 | 8/2017 | |

(Continued)

OTHER PUBLICATIONS

Audio based upselling/cross-selling at Self-Service POS, IPCOM000214856D, IP.com Electronic Publication Date: Feb. 7, 2012, IP.*

*Primary Examiner* — David J Stoltenberg
(74) *Attorney, Agent, or Firm* — Tong Rea Bentley & Kim LLC

(57) ABSTRACT

In an example implementation according to aspects of the present disclosure, a method may include determining a transactional state of a point of sale (POS) system and, upon determining the transactional state, when the POS system is not in transactional use, automatically switching a display panel of the POS system from a first position to a second position. As an example, while in the second position, the POS system displays an advertisement on the display panel.

15 Claims, 3 Drawing Sheets

(56) References Cited

U.S. PATENT DOCUMENTS

| | | | |
|---|---|---|---|
| 2015/0199882 A1 | 7/2015 | Fernando et al. | |
| 2015/0363757 A1* | 12/2015 | Mocko | G06F 40/58 |
| | | | 705/16 |
| 2016/0005020 A1* | 1/2016 | Fernando | G06Q 20/202 |
| | | | 705/21 |
| 2016/0091968 A1* | 3/2016 | Angelo | G06F 3/017 |
| | | | 345/156 |
| 2016/0124627 A1* | 5/2016 | Beatty | G06F 1/1694 |
| | | | 705/16 |
| 2016/0357378 A1* | 12/2016 | Kang | G06F 3/167 |
| 2017/0262892 A1 | 9/2017 | Fernando et al. | |
| 2017/0330237 A1* | 11/2017 | Canceri | G06K 9/00201 |
| 2017/0372286 A1* | 12/2017 | Hiroi | G07G 1/0009 |
| 2018/0240252 A1* | 8/2018 | Lee | G09G 3/20 |
| 2019/0303905 A1* | 10/2019 | Sanchez-Llorens | |
| | | | G06Q 20/4014 |
| 2021/0174770 A1* | 6/2021 | Lin | G09G 5/38 |

FOREIGN PATENT DOCUMENTS

| | | | | |
|---|---|---|---|---|
| JP | H09-44747 A | * | 8/1995 | G07G 1/01 |
| JP | 2016-186714 A | * | 10/2016 | G07G 1/00 |
| KR | 1999-0016113 A | * | 3/1999 | G07G 1/00 |
| WO | WO2015191468 | * | 12/2015 | G06F 30/00 |
| WO | WO-2015191468 | | 12/2015 | |
| WO | WO-2016061626 | | 4/2016 | |
| WO | WO202018111 | * | 7/2018 | G06Q 30/02 |
| WO | WO2020027768 | * | 7/2018 | G06Q 20/20 |

\* cited by examiner

DISPLAY PANELS OF POINT OF SALE SYSTEMS

BACKGROUND

Point of sale (POS) systems provide the ability for businesses to interact with their customers. As an example, in retail environments, in addition to a display panel for an associate to conduct a transaction with a customer on a POS system, a display panel may be required for the customer as well, for example, to complete the transaction, such as inputting a signature or scanning a QR code to authorize payment. Also, in order to account for lighting conditions in the retail environments, display panels of POS systems may be adjustable, for example, to reduce glare.

DETAILED DESCRIPTION

Examples disclosed herein provide the ability for a display panel of a POS system to switch between a first position and a second position, according to an example. As will be further described, if the POS system is not in transactional use, the display panel may be switched to a position facing customers, for example, in order to display advertisements. By having the capability to automatically switch positions, for example, to face customers and display advertisements, a retail establishment may be able to promote their products and potentially bring in additional revenue.

Figure 1:
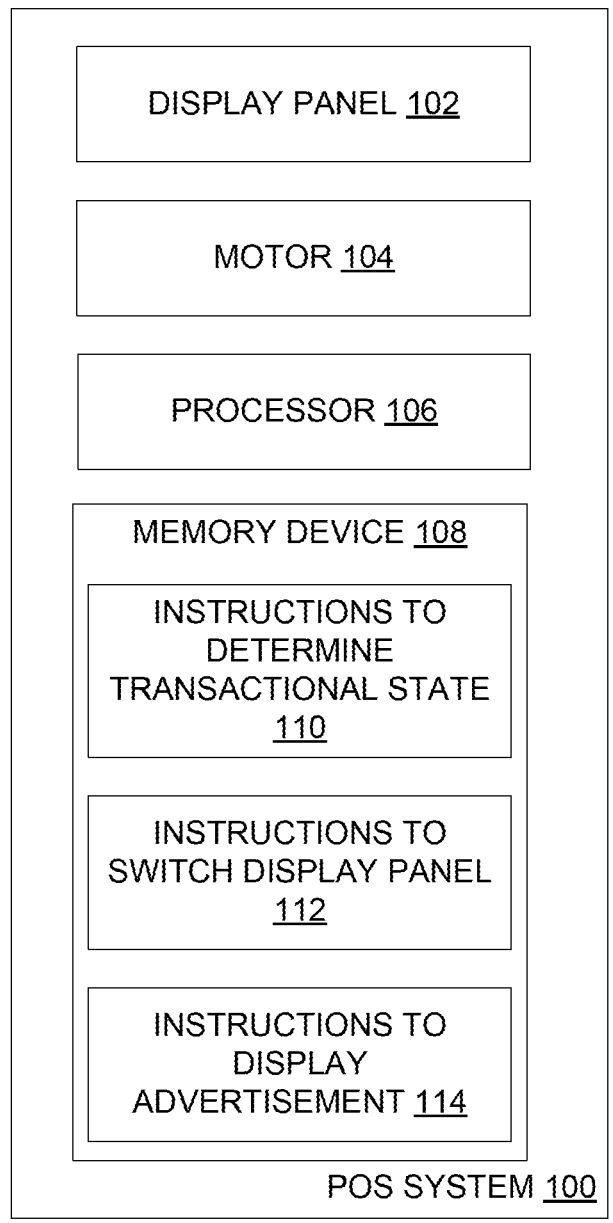
FIG. 1 illustrates a POS system with a display panel that can be automatically switched between a first position and second position, according to an example.

With reference to the figures, FIG. 1 illustrates a POS system 100 with a display panel 102 that can be automatically switched between a first position and second position, according to an example. The POS system 100 includes a motor 104 that may be activated to switch the display panel 102 between the first and second positions. As an example, the first position may correspond to the display panel 102 facing the merchant or associate, and the second position may correspond to the display 102 facing a customer, or facing the retail floor that attracts customer foot traffic. As an example of switching between the first and second positions, the POS system 100 may include a swivel feature that rotates the display panel 102 between the first and second positions. As a result, the motor 104 may be included in the swivel feature, in order to switch between the first and second positions. Rather than including a swivel feature, the POS system 100 may include a hinge mechanism for tilting the display panel 102, for example, between the first and second positions. As a result, the motor 104 may be included in the hinge mechanism, in order to switch between the first and second positions.

The POS system 100 depicts a processor 106 and a memory device 108 and, as an example of the POS system 100 performing its operations, the memory device 108 may include instructions 110-114 that are executable by the processor 106. Thus, memory device 108 can be said to store program instructions that, when executed by processor 106, implement the components of the POS system 100. The executable program instructions stored in the memory device 108 include, as an example, instructions to determine transactional state (110), instructions to switch display panel (112), and instructions to display advertisement (114).

Instructions to determine transactional state (110) represent program instructions that when executed by the processor 106 cause the POS system 100 to determine a transactional state of the POS system 100. For example, the POS system 100 may be in transactional use, where a transaction, such as a sale of items, is being committed between a merchant and a customer. However, after the sale is completed, or when the POS system 100 is not in transactional use, the POS system 100 may be in a null transactional state, where the POS system 100 may not be utilized. As will be further described, in order to provide the potential for a retail establishment to earn additional revenue when the POS system 100 is not in transactional use, the display panel 102 may automatically switch from the first position to the second position, for example, to display advertisement for the retail establishment.

Instructions to switch display panel (112) represent program instructions that when executed by the processor 106 cause the POS system 100, upon determining the transactional state, to activate the motor 104 to switch the display panel 102 from the first position to the second position, when the POS system 100 is not in transactional use. As an example, in addition to switching the display panel 102 from the first position to the second position when the POS system 100 is not in transactional use, the display panel 102 may also be switched from the first position to the second position when the POS system 100 is in transactional use, for example, upon nearing completion of a transaction, for a customer to complete the transaction (e.g., inputting a signature or scanning a QR code to authorize payment).

As described above, the motor 104 may be included in the mechanism that switches the display panel 102 between the first and second positions. For example, if the POS system 100 includes a swivel feature that rotates the display panel 102 between the first and second positions, the motor 104 may be included in the swivel feature. Rather than swiveling between the first and second positions, if the display panel 102 tilts between the first and second positions, the motor 104 may be included in the hinge mechanism for tilting the display panel 102. As an example, upon determining that the display panel 102 is to switch from the first position to the second position, a command is sent to the motor 104 to initiate the switch.

Instructions to display advertisement (114) represent program instructions that when executed by the processor 106 cause the POS system 100, while in the second position, to display an advertisement on the display panel 102. As a result, when the POS system 100 is not in a transaction, display panel 102 can auto rotate to an outward customer facing position (e.g., second position) and auto show advertisements, bringing in the potential for additional revenue. In addition, while the display panel 102 is in the second position, customers may be able to access features on the POS system 100, such as a self-checkout feature.

As an example, the POS system 100 includes audio sensors to evaluate sound levels of the environment surrounding the POS system 100. If the audio sensors determine that no customers are in the store, for example, by determining that the sound levels are below a threshold value, the POS system 100 may automatically switch the display panel 102 from the second position back to the first position and reduce the brightness of the display panel, for example, for energy savings. Although switching back to the first position may be the default lock position, the display panel 102 may remain in the second position, with the brightness set to low. As an example, rather than audio sensors, other sensor technologies may be used for determining customer presence, such as a proximity sensor.

In addition to switching the display panel 102 based on transactional use, the display panel 102 may switch based on user presence as well. As an example, while the display panel 102 is in the second position, if a user presence is detected at the POS system 100 where the display panel 102 would face while in the first position, the POS system 100 may automatically switch the display panel 102 from the second position to the first position. As an example, the user presence may correspond to an associate that returns to the POS system 100, detected, for example, via visual sensors. Visual sensors may pull visual information of the environment surrounding the POS system 100, for example, using cameras. As a result, cameras may capture associates or customers as they approach and use the POS system 100.

While in the first position, the POS system 100 may adjust a tilt angle of the display panel 102 based on environmental conditions, such as lighting conditions, and conditions involving the user presence with respect to the POS system 100. As an example, light sensors evaluate lighting conditions of the environment to determine the ideal display tilt angle, for example, to reduce glare. This may be particularly relevant when the POS system 100 includes the hinge mechanism for tilting the display panel 102. With regards to conditions related to user presence, a face detection algorithm may evaluate camera feeds for presence of a human face, for example, of the associate, and determine a viewing direction of the face. Upon determining the viewing direction of the face, for example, the direction where the associate may be viewing the display panel 102, the tilt angle of the display panel 102 may be further refined. Auto tilt angle adjustment of the display panel 102 may be particularly useful as the POS system 100 may be used by various associates during business hours. Although adjustments to the tilt angle of the display panel 102 are described while the display panel 102 is in the first position, similar adjustments may be made while the display panel 102 is in the second position as well, for example, during the self-checkout feature mentioned above.

As an example, in order to switch the display panel 102 back to the second position whenever possible, for example, to display advertisements, when the user presence described above is no longer detected (e.g., associate no longer present), if the POS system 100 is not in transactional use, the POS system 100 automatically switches the display panel 102 back to the second position to display advertisements.

Memory device 108 represents generally any number of memory components capable of storing instructions that can be executed by processor 106. Memory device 108 is non-transitory in the sense that it does not encompass a transitory signal but instead is made up of at least one memory component configured to store the relevant instructions. As a result, the memory device 108 may be a non-transitory computer-readable storage medium. Memory device 108 may be implemented in a single device or distributed across devices. Likewise, processor 106 represents any number of processors capable of executing instructions stored by memory device 108. Processor 106 may be integrated in a single device or distributed across devices. Further, memory device 108 may be fully or partially integrated in the same device as processor 106, or it may be separate but accessible to that device and processor 106.

In one example, the program instructions 110-114 can be part of an installation package that when installed can be executed by processor 106 to implement the components of the POS system 100. In this case, memory device 108 may be a portable medium such as a CD, DVD, or flash drive or a memory maintained by a server from which the installation package can be downloaded and installed. In another example, the program instructions may be part of an application or applications already installed. Here, memory device 108 can include integrated memory such as a hard drive, solid state drive, or the like.

Figure 2:
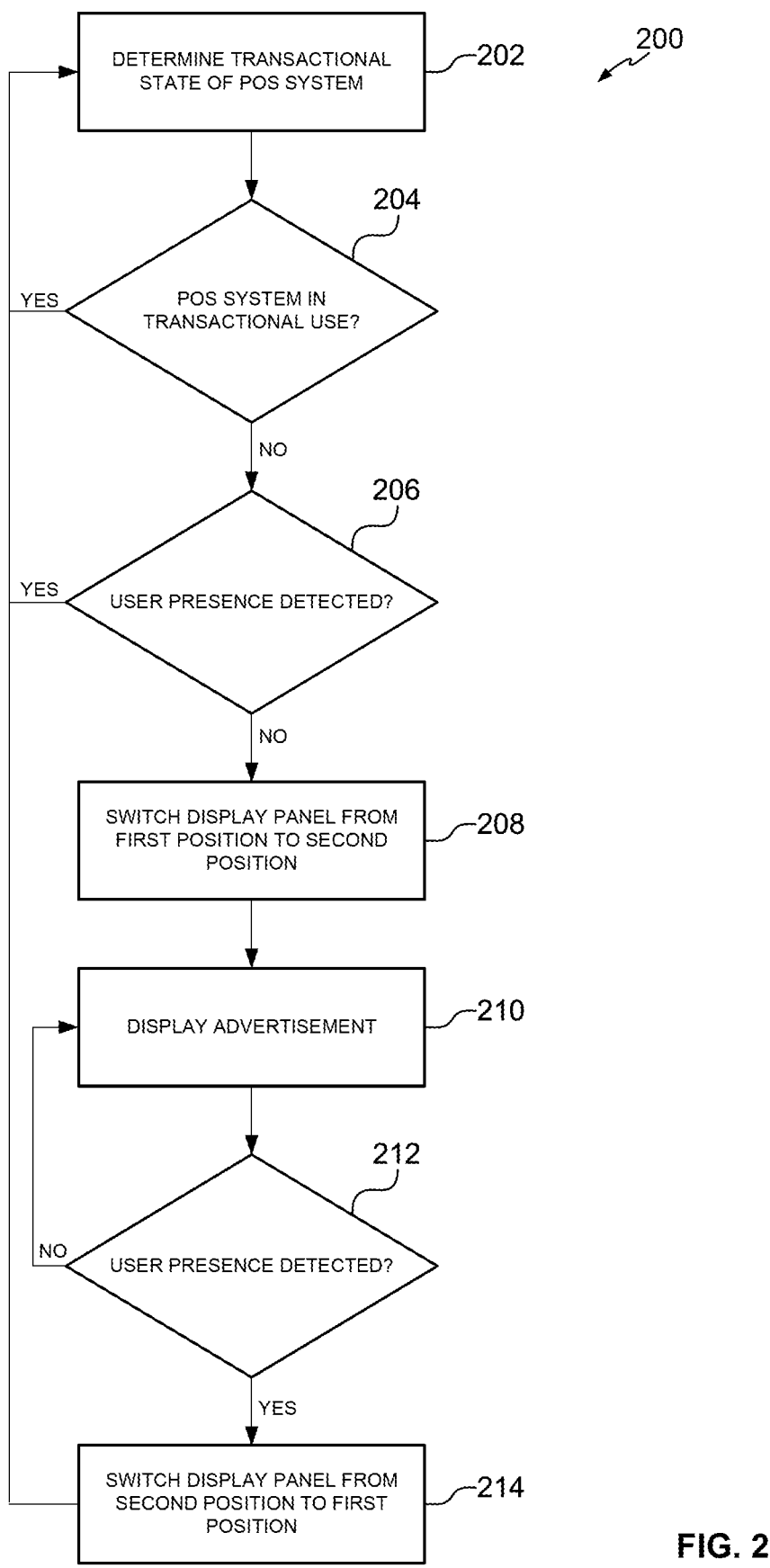
FIG. 2 illustrates a method at a POS system for switching a display panel of the POS system between a first position and a second position, according to an example.

FIG. 2 illustrates a method 200 at a POS system for switching a display panel of the POS system between a first position and a second position, according to an example. In discussing FIG. 2, reference may be made to the example POS system 100 illustrated in FIG. 1. Such reference is made to provide contextual examples and not to limit the manner in which method 200 depicted by FIG. 2 may be implemented.

Method 200 begins at 202, where the POS system determines the transactional state of the POS system. As described above, the POS system may be in transactional use, where a transaction, such as a sale of items, is being committed between a merchant and a customer. However, after the sale is completed, or when the POS system is not in transactional use, the POS system may be in a null transactional state, where the POS system may not be utilized. At 204, if it is determined that the POS system is in transactional use, method 200 returns to 202. Otherwise, method 200 proceeds to 206.

At 206, it is determined whether there is a user presence at the POS system, for example, in the environment around the POS system where the display panel would face while in the first position, which is where an associate would generally be located. As described above, visual sensors may pull visual information of the environment surrounding the POS system, for example, using cameras. If a user presence is located, for example, in the environment mentioned, method 200 returns to 202. Otherwise, method 200 proceeds to 208.

At 208, if the POS system is not in transactional use, and user presence is not detected, for example, in the environment around the POS system where the display panel would face while in the first position, the POS system may automatically switch the display panel from the first position to the second position. Then at 210, the POS system displays advertisements on the display panel. As described above, in order to provide the potential for a retail establishment to earn additional revenue when the POS system is not in transactional use, and user presence is not detected, the display panel may automatically switch from the first position to the second position, for example, to display advertisement for the retail establishment.

At 212, it is determined whether user presence is detected, for example, in the environment around the POS system where the display panel would face while in the first position. Such detection may occur, for example, when an associate returns to the POS system. If such detection does not occur, method 200 returns to 210, and advertisements continue to remain displayed on the display panel. However, if the user presence described above is detected, method 200 proceeds to 214, where the POS system automatically switches the display panel from the second position back to the first position, where the associate may begin use of the POS system. Method 200 then returns back to 202.

Figure 3:
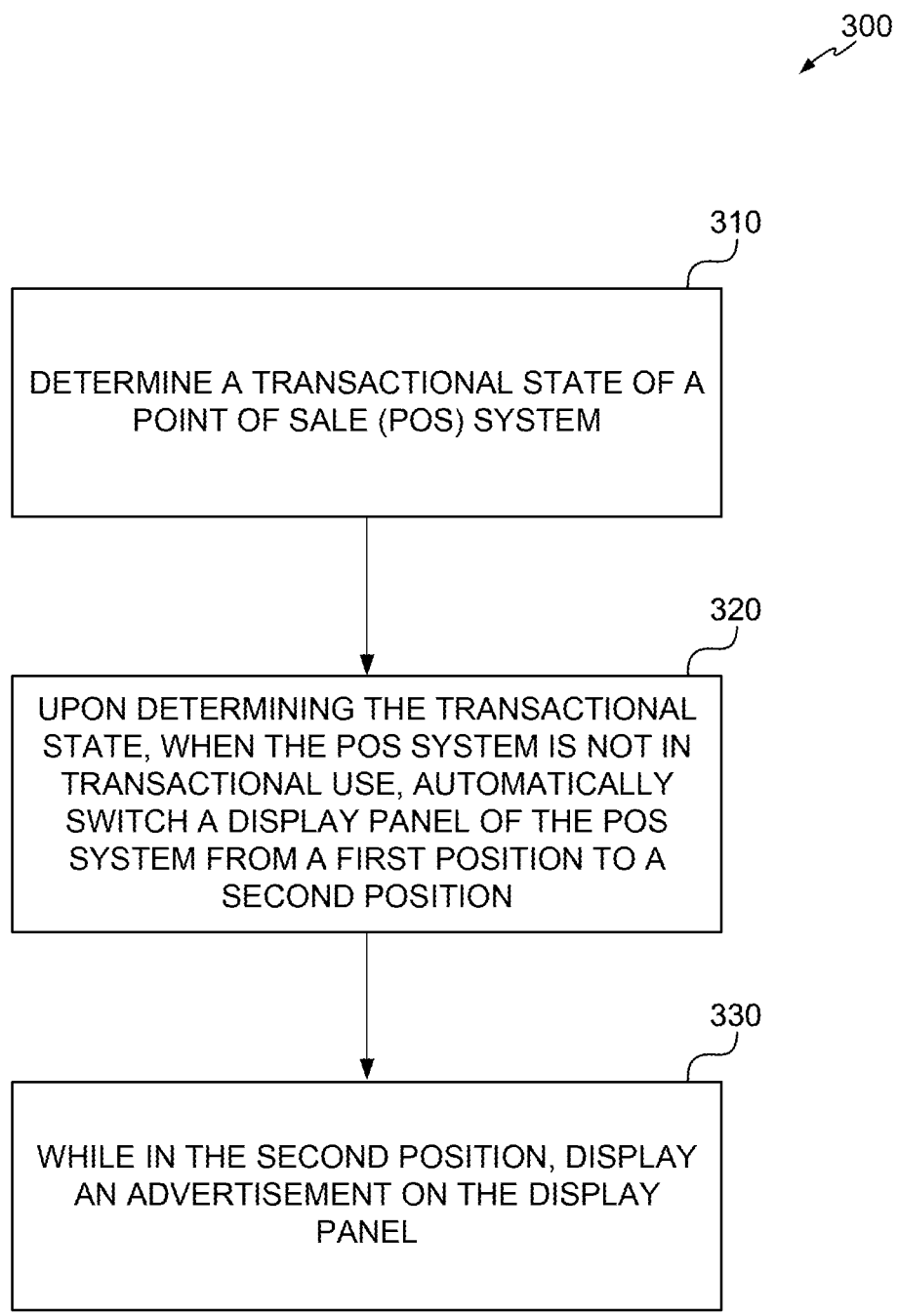
FIG. 3 is a flow diagram in accordance with an example of the present disclosure.

FIG. 3 is a flow diagram 300 of steps taken by a POS system to implement a method for switching a display panel of the POS system between a first position and second position, according to an example. Although the flow diagram of FIG. 3 shows a specific order of execution, the order of execution may differ from that which is depicted. For example, the order of execution of two or more blocks or arrows may be scrambled relative to the order shown. Also, two or more blocks shown in succession may be executed concurrently or with partial concurrence. All such variations are within the scope of the present invention.

At 310, the POS system determines a transactional state of the POS system. As an example, the POS system may be in transactional use, where a transaction, such as a sale of items, is being committed between a merchant and a customer. However, after the sale is completed, or when the POS system is not in transactional use, the POS system may be in a null transactional state, where the POS system may not be utilized. At 320, upon determining the transactional state, when the POS system is not in transactional use, the POS system automatically switches the display panel from the first position to the second position. At 330, while in the second position, the POS system displays an advertisement on the display panel.

As an example, while the display panel is in the second position, it may be determined whether customer presence exists around the POS system. For example, a sensor, such as an audio sensor, may evaluate sound levels surrounding the POS system. If sound levels fall below a threshold value, likely indicating that no customers may remain around the POS system, the POS system may automatically switch the display panel from the second position to the first position, and reduce a brightness of the display panel, for example, for energy savings.

As an example, while the display panel is in the second position, if the POS system detects a user presence at the POS system, where the display panel would face while in the first position, the POS system, upon detecting the user presence, may automatically switch the display panel from the second position back to the first position. While in the first position, the POS system may adjust a tilt angle of the display panel, based on environmental conditions, such as lighting conditions, and the user presence with respect to the POS system. As an example, a face detection algorithm may evaluate camera feeds for presence of a human face, for example, of an associate by the POS system, and determine a viewing direction of the face. Upon determining the viewing direction of the face, for example, the direction where the associate may be viewing the display panel, the tilt angle of the display panel may be adjusted accordingly. As an example, when the user presence is no longer detected, if the POS system is not in transactional use, the POS system may automatically switch the display panel back to the second position, for displaying advertisements.

It is appreciated that examples described may include various components and features. It is also appreciated that numerous specific details are set forth to provide a thorough understanding of the examples. However, it is appreciated that the examples may be practiced without limitations to these specific details. In other instances, well known methods and structures may not be described in detail to avoid unnecessarily obscuring the description of the examples. Also, the examples may be used in combination with each other.

Reference in the specification to "an example" or similar language means that a particular feature, structure, or characteristic described in connection with the example is included in at least one example, but not necessarily in other examples. The various instances of the phrase "in one example" or similar phrases in various places in the specification are not necessarily all referring to the same example.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the scope of the disclosure. Thus, the present disclosure is not intended to be limited to the examples shown herein but is to be accorded the widest scope consistent with the principles and novel features disclosed herein.

What is claimed is:

1. A method comprising:
   determining, by a processor of a point of sale (POS) system, a transactional state of the POS system;
   activating, by the processor, a motor to move a display panel of the POS system from a first position to a second position in response to the determining the transactional state of the POS system determining that the POS is not in transactional use; and
   causing, by the processor, an advertisement to be displayed on the display panel while the display panel is in the second position.

2. The method of claim 1, comprising:
   while in the second position, detecting a user presence at the POS system where the display panel would face while in the first position; and
   upon detecting the user presence, automatically switching the display panel from the second position to the first position.

3. The method of claim 2, comprising:
   while in the first position, adjusting a tilt angle of the display panel based on environmental conditions comprising lighting conditions and the user presence with respect to the POS system.

4. The method of claim 2, comprising:
   while in the first position, if the POS system is in transactional use, automatically switching the display panel from the first position to the second position upon nearing completion of a transaction, for a customer to complete the transaction.

5. The method of claim 2, comprising:
   when the user presence is no longer detected, if the POS system is not in transactional use, automatically switching the display panel to the second position to display the advertisement.

6. The method of claim 1, comprising:
   while in the second position, evaluating sound levels surrounding the POS system; and
   if the sound levels are below a threshold value, automatically switching the display panel from the second position to the first position and reducing a brightness of the display panel.

7. A point of sale (POS) system comprising:
   a display panel;
   a motor to switch the display panel between a first position and a second position; and
   a processor to:
      determine a transactional state of the POS system;
      activate the motor to switch the display panel from the first position to the second position in response to determining that the transactional state of the POS system is not in transactional use; and
      while in the second position, display an advertisement on the display panel.

8. The POS system of claim 7, comprising a visual sensor, wherein the processor is to:
- while in the second position, detect, via the visual sensor, a user presence at the POS system where the display panel would face while in the first position; and
- upon detecting the user presence, automatically switch the display panel from the second position to the first position.

9. The POS system of claim 8, wherein the processor is to:
- while in the first position, adjust a tilt angle of the display panel based on environmental conditions comprising lighting conditions and the user presence with respect to the POS system.

10. The POS system of claim 8, wherein the processor is to:
- while in the first position, if the POS system is in transactional use, automatically switch the display panel from the first position to the second position upon nearing completion of a transaction, for a customer to complete the transaction.

11. The POS system of claim 8, wherein the processor is to:
- when the user presence is no longer detected via the visual sensor, if the POS system is not in transactional use, automatically switch the display panel to the second position to display the advertisement.

12. The POS system of claim 7, comprising an audio sensor, wherein the processor is to:
- while in the second position, evaluate, via the audio sensor, sound levels surrounding the POS system; and
- if the sound levels are below a threshold value, automatically switch the display panel from the second position to the first position and reducing a brightness of the display panel.

13. A non-transitory computer-readable storage medium comprising program instructions which, when executed by a processor, cause the processor to:
- determine a transactional state of a point of sale (POS) system;
- upon determining the transactional state, when the POS system is not in transactional use, automatically switch a display panel of the POS system from a first position to a second position;
- while in the second position, display an advertisement on the display panel;
- while in the second position, evaluate sound levels surrounding the POS system; and
- if the sound levels are below a threshold value, automatically switch the display panel from the second position to the first position and reduce a brightness of the display panel.

14. The non-transitory computer-readable storage medium of claim 13, comprising program instructions which, when executed by the processor, cause the processor to:
- while in the second position, detect a user presence at the POS system where the display panel would face while in the first position; and
- upon detecting the user presence, automatically switch the display panel from the second position to the first position.

15. The non-transitory computer-readable storage medium of claim 14, comprising program instructions which, when executed by the processor, cause the processor to:
- when the user presence is no longer detected, if the POS system is not in transactional use, automatically switch the display panel to the second position to display the advertisement.

* * * * *